(12) United States Patent
Festag et al.

(10) Patent No.: US 8,662,530 B2
(45) Date of Patent: Mar. 4, 2014

(54) VEHICLE SEAT ASSEMBLY WITH RIGID AIR BAG PROTECTION MEMBER

(75) Inventors: Peter Festag, Erding (DE); Michael Tracht, Ingolstadt (DE)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 13/558,796

(22) Filed: Jul. 26, 2012

(65) Prior Publication Data

US 2013/0082495 A1   Apr. 4, 2013

(30) Foreign Application Priority Data

Sep. 29, 2011  (DE) .......................... 10 2011 083 759

(51) Int. Cl.
*B60R 21/207*   (2006.01)

(52) U.S. Cl.
USPC .................. 280/730.2; 280/728.3; 297/216.1; 297/216.3

(58) Field of Classification Search
USPC .............. 297/216.1, 216.3; 280/730.2, 728.2, 280/728.3
See application file for complete search history.

(56) References Cited

U.S. PATENT DOCUMENTS

| | | | | |
|---|---|---|---|---|
| 5,669,627 | A * | 9/1997 | Marjanski et al. | ......... 280/728.3 |
| 6,341,797 | B1 * | 1/2002 | Seo | ............. 280/730.2 |
| 6,386,577 | B1 | 5/2002 | Kan et al. | |
| 7,380,812 | B2 | 6/2008 | Tracht et al. | |
| 7,540,529 | B2 | 6/2009 | Tracht et al. | |
| 7,695,064 | B2 | 4/2010 | Thomas et al. | |
| 2002/0130495 | A1 | 9/2002 | Lotspih et al. | |
| 2006/0113759 | A1 * | 6/2006 | Tracht et al. | ............... 280/730.2 |
| 2006/0113767 | A1 * | 6/2006 | Tracht | ......... 280/730.2 |
| 2006/0113769 | A1 * | 6/2006 | Tracht | ......... 280/730.2 |
| 2006/0255572 | A1 * | 11/2006 | Svenbrandt et al. | ........ 280/730.2 |
| 2008/0217887 | A1 | 9/2008 | Seymour et al. | |
| 2009/0243266 | A1 | 10/2009 | Smith | |
| 2011/0193327 | A1 | 8/2011 | Tracht et al. | |
| 2012/0175924 | A1 * | 7/2012 | Festag et al. | ............... 297/216.1 |

FOREIGN PATENT DOCUMENTS

| | | |
|---|---|---|
| DE | 102005057439 A1 | 7/2006 |
| DE | 102005057499 A1 | 7/2006 |
| DE | 102009025583 A1 | 3/2010 |
| DE | 201010001772 A1 | 8/2011 |
| GB | 2398546 A | 8/2004 |

OTHER PUBLICATIONS

German Office Action Dated May 3, 2012, Application No. 10 2011 083 759.0, Applicant Lear Corporation, 11 Pages.

* cited by examiner

*Primary Examiner* — Ruth Ilan
(74) *Attorney, Agent, or Firm* — Brooks Kushman P.C.

(57) ABSTRACT

A vehicle seat assembly according to the present disclosure includes an air bag module having a front and a side, and the air bag module includes an inflatable air bag and a rigid cover at least partially covering the air bag. The rigid cover may include a protection portion that extends at least partially along the side of the air bag module. The protection portion has an end spaced away from the front of the air bag module. The seat assembly further includes a seat pad disposed outside of the air bag module, and a trim cover positioned over the seat pad. In at least one embodiment, upon inflation of the air bag, the end of the protection portion is configured to move forwardly such that the protection portion extends between the seat pad and the air bag.

18 Claims, 4 Drawing Sheets

VEHICLE SEAT ASSEMBLY WITH RIGID AIR BAG PROTECTION MEMBER

CROSS-REFERENCE TO RELATED APPLICATIONS

This application claims foreign priority benefits under 35 U.S.C. §119(a)-(d) to DE 10 2011 083 759.0, filed Sep. 29, 2011, the disclosure of which is hereby incorporated by reference in its entirety.

TECHNICAL FIELD

The present disclosure relates to a vehicle seat assembly having an inflatable air bag.

BACKGROUND

Vehicle seat assemblies may be provided with inflatable air bags. U.S. Pat. No. 6,386,577, and U.S. published applications. 2009/0243266 and 2011/0193327 disclose examples of such vehicle seat assemblies.

SUMMARY

A vehicle seat assembly according to the present disclosure includes an air bag module having a front and a side, and the air bag module further includes an inflatable air bag and a rigid cover at least partially covering the air bag. The rigid cover forms an outermost portion of the air bag module and includes a protection portion that extends at least partially along the side of the air bag module. The protection portion has an end spaced away from the front of the air bag module. The seat assembly further includes a seat pad disposed outside of the air bag module, and a trim cover positioned over the seat pad. Upon inflation of the air bag, the end of the protection portion is configured to move forwardly such that the protection portion extends between the air bag and a seat component inboard of the air bag.

In at least one embodiment, the end is releasably connected to another portion of the air bag module. In at least another embodiment, the end is spaced from another end of the air bag module.

Still further, a vehicle seat assembly according to the present disclosure includes an air bag module having a front and a side. The air bag module further includes an inflatable air bag and a rigid cover at least partially covering the air bag. The rigid cover has a frangible portion that at least partially defines a flap portion. The flap portion extends at least partially along the front and the side of the air bag module and has an end spaced away from the front of the air bag module. The seat assembly further includes a seat pad portion disposed in front of the air bag module, and a trim cover positioned over the seat pad. Upon inflation of the air bag, the frangible portion of the rigid cover is configured to rupture and the end of the flap portion is configured to move forwardly such that the flap portion extends between the seat pad portion and the air bag.

An air bag module for use with a vehicle seat having a seat pad and trim cover is also disclosed. The air bag module has an inflatable air bag, and a rigid member covering a portion of the air bag and forming an outermost portion of the air bag module. The rigid member includes a protection portion having an end that is spaced away from a front of the air bag module, and the end is releasably connected to another portion of the rigid member. Upon inflation of the air bag, the end of the protection portion is configured to be released and extend forwardly such that the protection portion extends between a portion of the seat pad and the air bag.

While exemplary embodiments are illustrated and disclosed, such disclosure should not be construed to limit the claims. It is anticipated that various modifications and alternative designs may be made without departing from the scope of the invention.

DETAILED DESCRIPTION

The present disclosure describes various vehicle seat configurations that include an inflatable air bag assembly. Several specific embodiments are set forth in the following description and in FIGS. 1-4 to provide a thorough understanding of certain embodiments according to the present disclosure. As those of ordinary skill in the art will understand, one or more features of an embodiment illustrated and described with reference to any one of the Figures may be combined with features illustrated in one or more other Figures to produce embodiments that are not explicitly illustrated or described. In addition, other embodiments may be practiced without one or more of the specific features explained in the following description.

Figure 1:
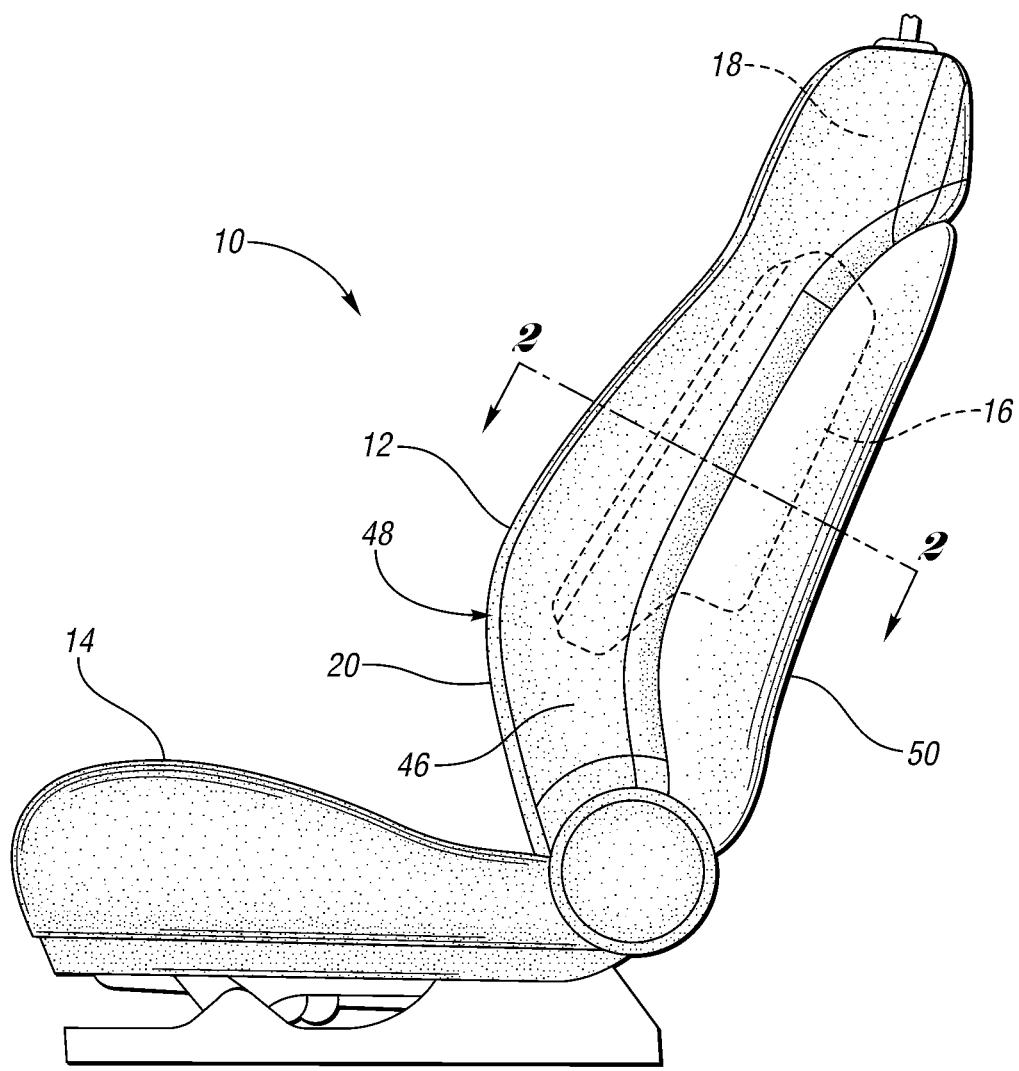
FIG. 1 is a side view of a vehicle seat assembly according to the present disclosure and including an air bag module positioned in a seat back cushion assembly.

FIG. 1 shows a vehicle seat assembly 10 according to the present disclosure for use in a motor vehicle. The seat assembly 10 includes a seat back cushion assembly 12 and a seat bottom cushion assembly 14 attached to the seat back cushion assembly 12. The seat back cushion assembly 12 includes an air bag arrangement or assembly, such as a hard cover air bag module 16, a seat pad 18 overlaying the air bag module 16, and a trim cover 20 overlaying the seat pad 18 and air bag module 16.

Figure 2:
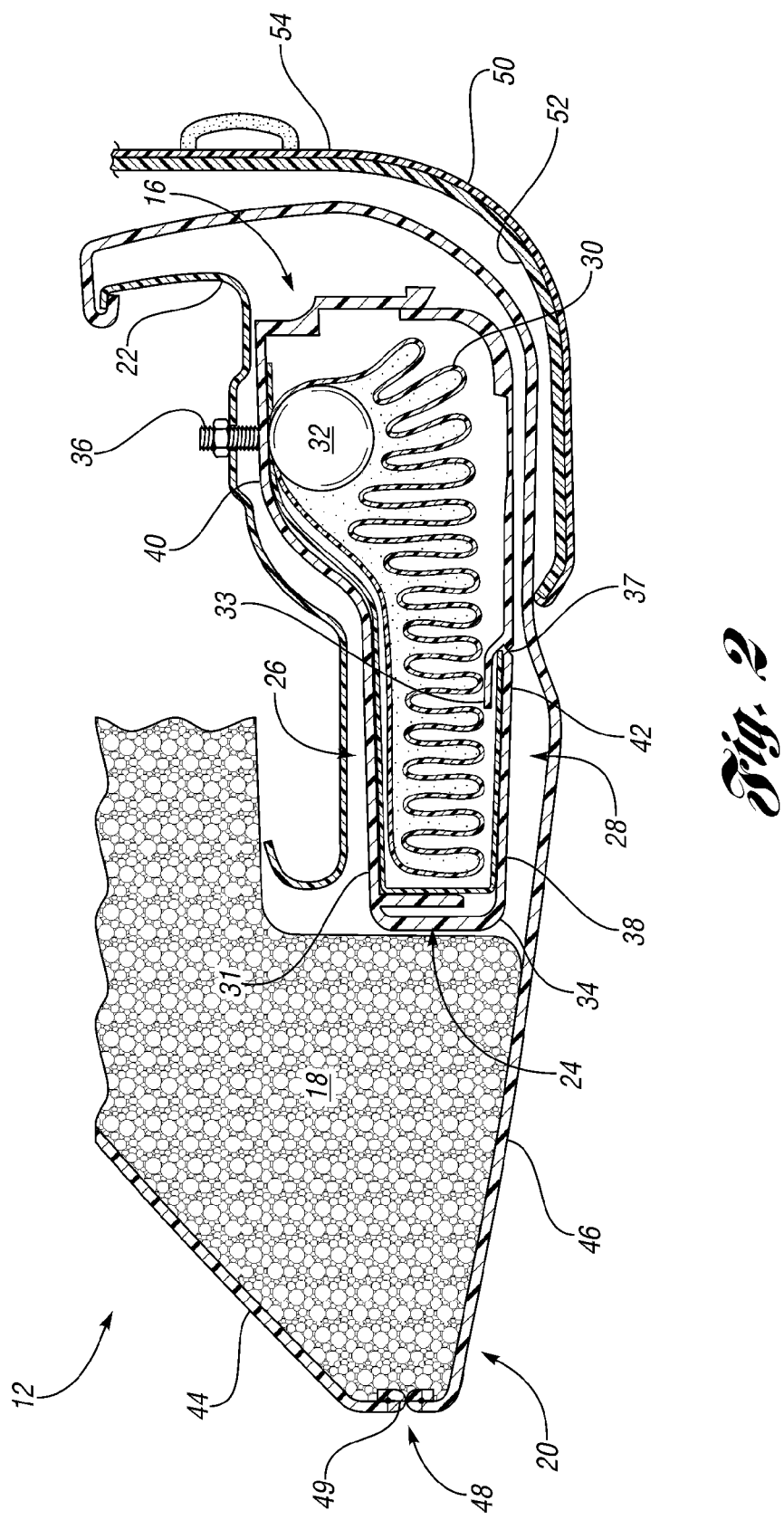
FIG. 2 is a fragmentary cross-sectional view of the seat back cushion assembly taken along line 2-2 of FIG. 1 and showing various components of the air bag module.

As shown in FIG. 2, the air bag module 16 may be disposed proximate one side of the seat back cushion assembly 12, such as an outboard lateral side or an inboard lateral side, and may be connected to a support member, such as a seat back frame 22. In the embodiment shown in FIG. 2, the air bag module 16 is disposed on an outboard side of the seat back frame 22. As another example, the air bag module 16 may be connected to the frame 22 such that the air bag module 16 is disposed on an inboard side of the frame 22. As yet another example, the air bag module 16 may be located in any suitable position on the seat back cushion assembly 12 or seat bottom cushion assembly 14. Furthermore, the seat back cushion assembly 12 and seat bottom cushion assembly 14 may each be provided with multiple air bag modules 16, such as outboard and inboard air bag modules 16 that each have a similar configuration and function as described below.

In the embodiment shown in FIG. 2, the air bag module 16 has a front 24 and first and second sides, such as inboard and outboard sides 26 and 28, respectively. The inboard side 26 is positioned closer to the center of the seat back cushion assembly 12 than the outboard side 28, and the outboard side 28 may be positioned proximate a door panel of a vehicle in which the seat assembly is installed. Furthermore, the air bag module 16 includes an inflatable air bag 30, an inflator 32 attached to the air bag 30 for inflating the air bag 30, and a rigid member, such as cover 34, that at least partially covers the air bag 30 and inflator 32.

The inflator 32 may be connected to the frame 22, or other suitable support member, in any suitable manner, such as with one or more fasteners 36. The fasteners 36, which may each include a bolt and nut for example, may also be used to connect the cover 34 to the frame 22. Alternatively, the air bag module 16 may be connected to the frame 22, or other suitable support member, in any suitable manner.

In the embodiment shown in FIG. 2, the cover 34 completely surrounds the air bag 30 and inflator 32, and forms the outermost portion of the air bag module 16. In such an embodiment, the air bag module 16 does not include a flexible housing, such as a fabric housing, and may be referred to as a "hard cover" air bag module. In other "hard cover" embodiments, the cover 34 may partially cover the air bag 30 and/or inflator 32.

As illustrated, the cover 34 may have a body 31, such as a clam-shell body, that substantially surrounds the air bag 30 and inflator 32. The body 31 may comprise a relatively rigid molded plastic material, such as polypropylene, TPO (thermoplastic olefin), and/or EPDM rubber (ethylene propylene diene monomer rubber). Alternatively, the body 31 may be made of any suitable rigid material and in any suitable manner. In at least one embodiment, the cover 34 is made of a rigid material having a flexural modulus of 200 to 5000 MPa, in another embodiment of 225 to 1000 MPa, and in yet another embodiment of 300 to 550 MPa. Flexural modulus can be measured by ISO 178.

In the embodiment shown in FIG. 2, the cover 34 has a frangible portion 37, such as a rupture or tear section or seam, that at least partially defines a protection portion, such as flap portion 38, which is described below in more detail. For example, the frangible portion 37 may be a thinned section or a perforated or otherwise weakened section or area of the cover 34 that is designed to rupture upon inflation of the air bag 30. In another embodiment, the frangible portion 37 could comprise two opposed ends or sections of the cover 34 that are secured to each other by one or more adhesive, adhesive tape, or other type of temporary fastener. Rupturing the frangible portion 37, as is done upon deployment of the air bag 30, allows the previously connected portions of the cover 34 to move relative to each other.

While the frangible portion 37 may have any suitable configuration, in at least one embodiment, the frangible portion 37 extends along top and bottom portions of the front 24 of the air bag module 16, and along top, rear and bottom portions of the outboard side 28 of the air bag module 16. At least a section of the frangible portion 37 extends generally vertically or upwardly along the entire length or height of the air bag module 16, or a substantial portion of the height of the air bag module 16, and that section is spaced rearwardly away from the front 24 of the air bag module 16. For example, the generally upwardly extending section of the frangible portion 37 may extend at least 50% of the height of the air bag module 16. As another example, the generally upwardly extending section of the frangible portion 37 may extend at least 75% of the height of the air bag module 16.

Returning to FIG. 2, the illustrated flap portion 38 is a single thickness, such as 0.5 to 3 mm, or layer of the rigid material of the cover 34 (e.g., the flap portion 38 is not folded over or on itself) and extends along the front 24 and sides 26 and 28 of the air bag module 16. Furthermore, the illustrated flap portion 38 has a first secured portion or end 40, and a second releasable portion or end 42 disposed adjacent the frangible portion 37 such that the second end 42 is spaced away from the front 24 of the air bag module 16. In the embodiment shown in FIG. 2, the first end 40 is attached to the frame 22 with one or more of the fasteners 36. Alternatively, the first end 40 may be secured in any suitable manner. For example, the first end 40 may be attached to frame 22, or another component connected to the frame 22, with adhesive and/or one or more fasteners.

As best shown in FIG. 2, the rear outboard portion of the cover 34 has an optional deflectable tab 33. The tabs 33 extend from adjacent the distal end of the rear inboard portion of the cover 34 towards the front 24 of the air bag module 16. The tab 33 can be 0.2 to 3 cm long and 0.5 to 3 mm wide or thick. Upon deployment of the air bag 30, as can be best seen in FIGS. 3 and 4, the tab 33 is urged by the deploying air bag 30 into the trim cover 20 and can act as a shield to help protect the trim cover from tearing adjacent the frangible portion 37 due to any rough edges (e.g., saw tooth edges) of the inboard portion of the cover 34 that may result from rupture of the frangible portion 37. Furthermore, the deflectable tab 33 may function as a deflector to guide the air bag 30 forwardly towards seam 48 of the trim cover 20. Still further, the deflectable tab 33 may sufficiently cover at least a portion of the second section 46 of the trim cover 20 and provide a smooth deployment surface for an outboard side of the air bag 30.

In the embodiment shown in FIG. 2, the second end 42 is disposed on the outboard side 28 of the air bag module 16 rearward of the front 24 of the air bag module 16, and the second end 42 faces rearwardly. As another example, the second end 42 may be disposed at or near a rear portion of the air bag module 16. As yet another example, the second end 42 may be disposed between ¼ and ¾ of the length of the outboard side of the air bag module from the front 24 of the air bag module 16, and in yet another example, between ¼ and ½ of the length of the outboard side 28 from the front 24 of the air bag module 16.

Upon inflation of the air bag 30, the frangible portion 37 is configured to rupture to release the second end 42, such that the flap portion 38 may move or extend forwardly generally in a deployment direction of the air bag 30. When the flap portion 38 moves forwardly, the flap portion 38 may extend between a portion of the seat pad 18 and the air bag 30, thereby protecting the seat pad 18 and/or the air bag 30.

In yet another embodiment, the second end 42 is a free end spaced from another, opposing, end (not shown) of the cover 34, such as 0.1 to 5 mm apart, or 1 to 3 mm apart. In this embodiment, one or more adhesive tape pieces or other temporary fasteners could be used to maintain the ends relative to each other prior to air bag deployment. In this embodiment, upon inflation of the air bag 30, the second end 42 is movable from the another end, such that the flap portion 38 may move or extend forwardly generally in a deployment direction of the air bag 30. When the flap portion 38 moves forwardly, the flap portion 38 may extend between a portion of the seat pad 18 and the air bag 30, thereby protecting the seat pad 18 and/or the air bag 30.

Still referring to FIG. 2, the seat pad 18 may be disposed adjacent the air bag module 16 and the frame 22. For example, the seat pad 18 may be disposed in front of and along an inboard side of the air bag module 16 and frame 22, as shown in FIG. 2. As another example, the seat pad 18 may be disposed in front of, behind and along the inboard and outboard sides 26 and 28 of the air bag module 16 and frame 22. In at least one embodiment, the seat pad 18 is made from a molded polymeric material, such as a polyurethane foam. Alternatively, the seat pad 18 may comprise any suitable material, and may be made in any suitable manner.

The trim cover 20 may be made of any suitable material, such as cloth, vinyl and/or leather, and may be provided with or without a padding layer and/or backing layer. Furthermore, the trim cover 20 may include multiple pieces that are joined together at seams. In the embodiment shown in FIGS. 1 and 2, the trim cover 20 includes first and second sections 44 and 46, respectively, that cooperate to define a deployment seam 48 through which the air bag 30 may deploy. For example, the sections 44 and 46 may be connected together such as with sewn stitching 49, as shown in FIG. 2. As another example, ends of the first and second sections 44 and 46, respectively, may not be directly connected together, but merely abut each other to define the seam 48. In the embodiment shown in FIG. 2, the first section 44 is a bolster front section that faces a seat occupant when the seat occupant is seated on the seat assembly 10, and the second section 46 is a bolster outboard side section that may face a vehicle door of a vehicle in which the seat assembly 10 is mounted. The trim cover 20 further includes additional sections not visible in FIG. 2.

As shown in FIGS. 1 and 2, in at least the illustrated embodiment, a relatively rigid panel 50 may also be provided in the rear area of the seat back cushion assembly 12 to provide support, to cover a portion of the seat back cushion assembly 12 and/or for aesthetics. The panel 50 may include a main body 52, such as a plastic molding. In addition, the panel 50 may include a cover layer 54 made of any suitable material, such as cloth, leather or vinyl, attached to the main body 52.

Figure 3:
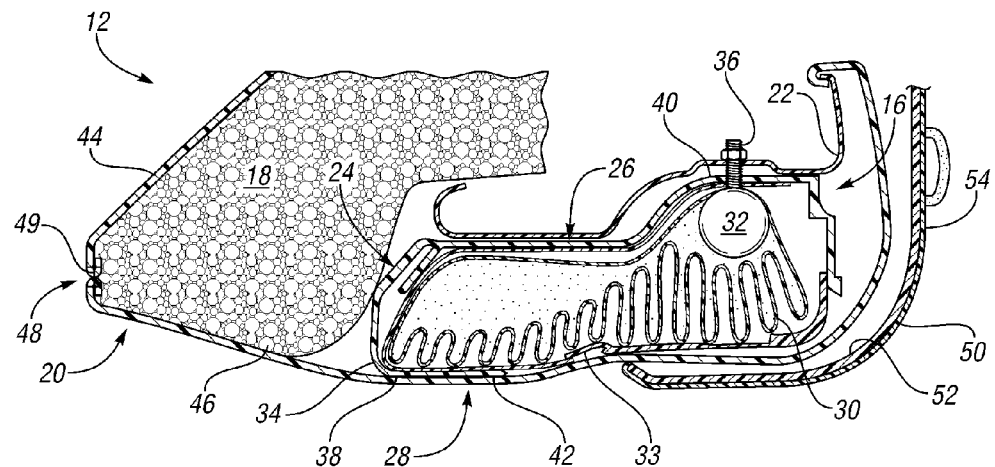
FIG. 3 is a fragmentary cross-sectional view of the seat back cushion assembly, similar to FIG. 2, showing the air bag partially inflated.
Figure 4:
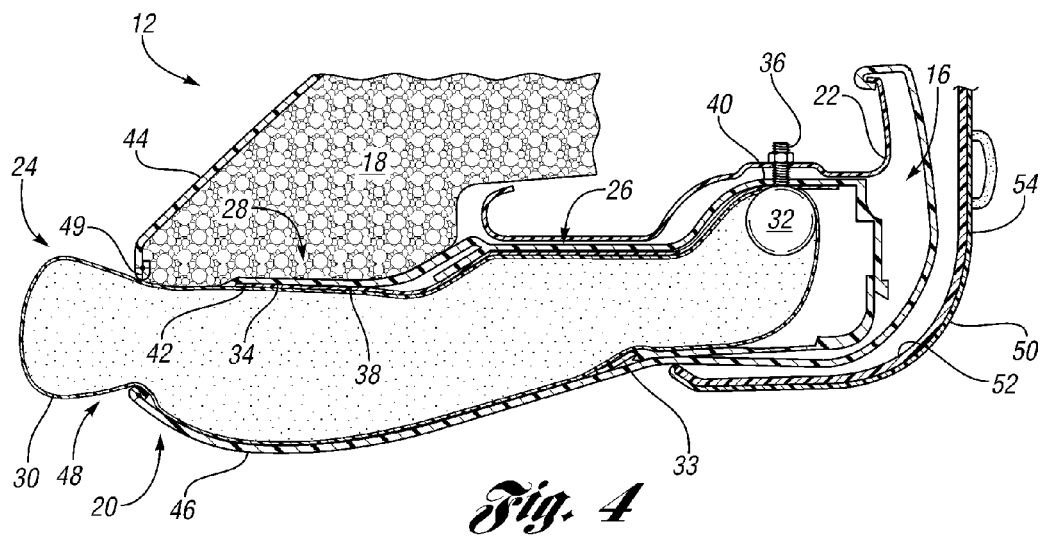
FIG. 4 is a fragmentary cross-sectional view of the seat back cushion assembly showing the air bag more fully inflated and an end of the rigid member extending forwardly.

Referring to FIGS. 2, 3 and 4, operation of the vehicle seat assembly 10 will now be described in detail. Upon a sufficient triggering event, such as impact to a vehicle in which the seat assembly 10 is mounted or other sufficient acceleration or deceleration event, for example, the air bag module 16 may be activated in any suitable manner to cause the air bag 30 to deploy. For example, a controller (not shown) may energize the inflator 32 upon receiving input from a sensor (not shown) that is indicative of a sufficient triggering event. During deployment, the inflator 32 inflates the air bag 30, which causes the frangible portion 37 to rupture. As shown in FIG. 3, the expanding air bag 30 causes a front portion and the second end 42 of the flap portion 38 to move forwardly. In the embodiment shown in FIGS. 2-4, for example, the inflating air bag 30 causes the frangible portion 37 to rupture, and further causes the rear inboard cover portion, or a portion thereof, to flex outwardly and a portion of the front inboard cover portion to move forwardly.

Referring to FIG. 4, as the air bag 30 continues to inflate, the air bag 30 causes the second end 42 of the flap portion 38 to extend between the seat pad 18 and the air bag 30. The inflating air bag 30 may also rupture the deployment seam 48 so that the air bag 30 may project through the trim cover 20.

In the embodiment shown in FIG. 4, the flap portion 38 and the remainder of the cover 34 do not extend outside of the trim cover 20 during and after inflation of the air bag 30. In another embodiment, the flap portion 38 may be configured to extend outside of the trim cover 20 during inflation of the air bag 30.

With the above configuration, the cover 34 may protect the seat pad 18 and inhibit or prevent portions of the seat pad 18 from breaking off during deployment of the air bag 30. The cover 34 may also facilitate deployment of the air bag 30 by providing a guide surface for the air bag 30 and/or by reducing friction between the air bag 30 and the seat pad 18 or other components of the seat assembly 10.

Figure 5:
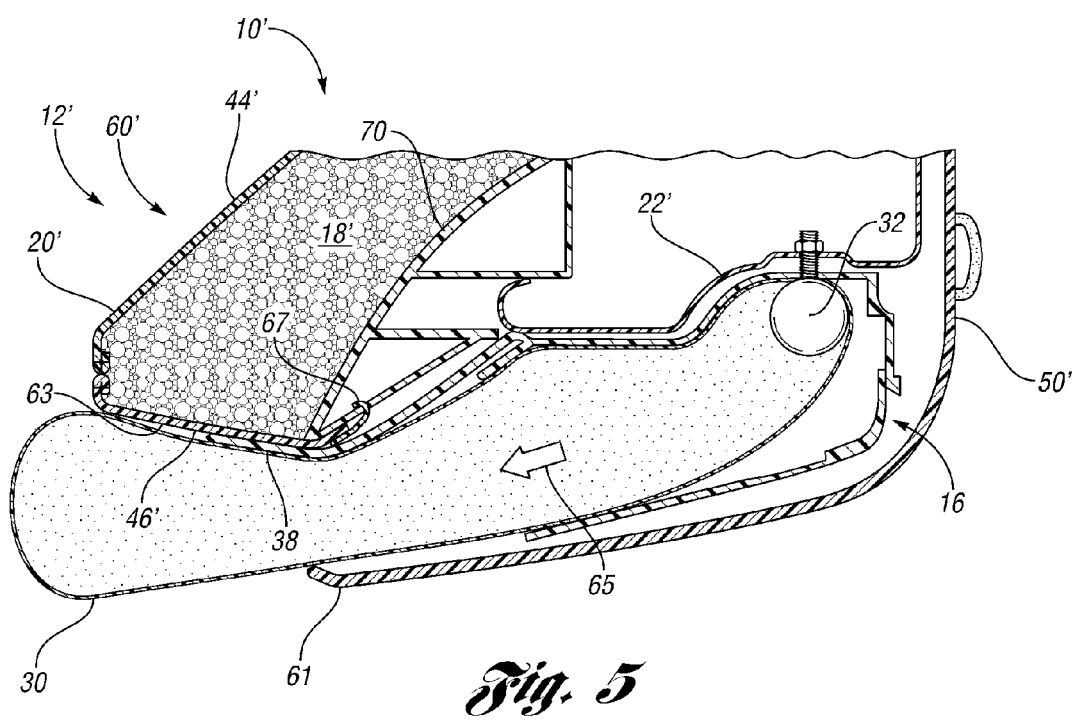
FIG. 5 is a view similar to FIG. 2 showing another embodiment.

Referring to FIG. 5, an alternate embodiment of seat assembly 10' is illustrated. This embodiment may function in a similar manner as discussed above in detail. In this embodiment air bag 30 of the air bag module 16 deploys between back panel 50' and trim cover 20' of the seat back 12' of seat assembly 10'. More specifically, air bag 30 deploys in a forward deployment direction between a front portion 61 of back panel 50' and an outboard side 63 of second portion 46' of trim cover 20', as indicated by deployment direction arrow 65. Furthermore, second section 46' of the trim cover 20' is connected, via a J clip 67 or suitable fastener, to a plastic retainer member 70, which is attached to frame 22' in any suitable manner, such as with one or more J-clips or fasteners. The retainer member 70 may also provide support to seat pad 18' positioned over the retainer member 70. As another example, the retainer member 70 may be omitted, and the trim cover 20' may be connected directly to the frame 22' such as with one or more J-clips.

Upon inflation of the air bag 30, the flap portion 38 extends forwardly between the outboard side 63 of the second section 46' of the trim cover 20' and the air bag 30. In this embodiment, the flap portion 38 sufficiently covers retainer member 70 and functions as a protection section that protects the air bag 30 during deployment. Furthermore the flap portion 38 extends over the outboard side 63 of the trim cover 20' during deployment of the air bag 30, and provides a smooth deployment surface for the air bag 30.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention. For example, any of the above air bag module embodiments may be used with any suitable vehicle seat configuration, such as any of the above described seat assemblies. As another example, any of the flap portions of the above described air bag module embodiments may extend between the associated air bag and any other seat component, or multiple components, to protect the air bag and/or seat component(s) during air bag deployment.

What is claimed is:

1. A vehicle seat assembly comprising:
   an air bag module having a front and a side, the air bag module including an inflatable air bag and a rigid cover at least partially covering the air bag, the rigid cover forming an outermost portion of the air bag module and including a protection portion that extends at least partially along the side of the air bag module, the protection portion having an end spaced away from the front of the air bag module;
   a seat pad disposed outside of the air bag module; and
   a trim cover positioned over the seat pad;
   wherein, upon inflation of the air bag, the end of the protection portion is configured to move forwardly such that the protection portion extends between the air bag and a bolster retainer member, such that the protection portion upon inflation of the air bag, is configured to extend between the bolster retainer member and the air bag.

2. The vehicle seat assembly of claim 1 wherein the end is releasably connected to another portion of the rigid cover, wherein, upon inflation of the air bag, the end of the protection portion is configured to disconnect from the another portion of the rigid cover to move forwardly to extend between the seat pad and the air bag.

3. The seat assembly of claim 2 wherein the rigid cover includes a frangible portion, and wherein the end of the protection portion is releasably connected to the another portion of the rigid cover at the frangible portion.

4. The seat assembly of claim 3 wherein and the air bag module further includes an inflator connected to the air bag for inflating the air bag, and the trim cover includes a tear seam through which the air bag is deployable, the frangible portion being spaced rearwards from the tear seam and closer to the inflator than the tear seam.

5. The vehicle seat assembly of claim 1 wherein the protection portion, upon inflation of the air bag, is configured to extend between the seat pad and the air bag.

6. The vehicle seat assembly of claim 5 wherein the seat pad includes a seat pad portion disposed in front of the air bag module and having an outboard side, and wherein the protection portion is configured to extend between the outboard side of the seat pad portion and the air bag upon inflation of the air bag.

7. The seat assembly of claim 1 wherein the rigid cover comprises an inboard portion and an outboard portion, the end of the protection portion being located on the outboard portion of the rigid cover.

8. The seat assembly of claim 7 wherein the end of the protection portion is spaced from an opposing end of the outboard portion of the rigid cover such that a space extends between the opposed ends.

9. The seat assembly of claim 7 wherein the outboard portion includes a deflectable tab that extends towards the front of the air bag module, the tab, upon inflation of the air bag, deflecting over an opposed end of the outboard portion of the rigid cover.

10. A vehicle seat assembly comprising:
an air bag module having a front and a side, the air bag module including an inflatable air bag and a rigid cover at least partially covering the air bag, the rigid cover having a frangible portion that at least partially defines a flap portion, the flap portion extending at least partially along the front and the side of the air bag module and having an end spaced away from the front of the air bag module, wherein the rigid cover comprises an inboard portion and an outboard portion, the end of the protection portion being located on the outboard portion of the rigid cover and wherein the outboard portion includes a deflectable tab that extends towards the front of the air bag module;
a seat pad portion disposed in front of the air bag module; and
a trim cover positioned over the seat pad portion;
wherein, upon inflation of the air bag, the frangible portion of the rigid cover is configured to rupture and the end of the flap portion is configured to move forwardly such that the flap portion extends between the seat pad portion and the air bag, or between the trim cover and the air bag.

11. The seat assembly of claim 10 wherein the rigid cover forms a housing that extends around the air bag, and wherein the frangible portion is at a position between ¼ and ½ of the length of the side from the front of the air bag module.

12. The seat assembly of claim 10 wherein the side of the air bag module has a length l, and the frangible portion is located between ¼ and ¾ of the length of the side of the air bag module from the front of the air bag module.

13. The seat assembly of claim 10 wherein the flap portion is configured to cover an outboard side of the seat pad portion.

14. The seat assembly of claim 10 wherein the air bag module has a height, and the frangible portion includes a generally upwardly extending section that extends along a substantial portion of the height of the air bag module, and wherein the generally upwardly extending section is spaced away from the front of the air bag module.

15. The seat assembly of claim 10 wherein the frangible portion comprises a thinner section relative to adjacent portions of the rigid cover.

16. The seat assembly of claim 10 wherein the frangible portion comprises a perforated section.

17. An air bag module for use with a vehicle seat having a seat pad and a trim cover positioned over the seat pad, the air bag module comprising:
an inflatable air bag; and
a rigid member covering at least a portion of the air bag and forming an outermost portion of the air bag module, the rigid member including a protection portion having an end that is spaced away from a front of the air bag module, the end being releasably connected to another portion of the rigid member;
wherein, upon inflation of the air bag, the end of the protection portion is configured to be released and extend forwardly such that the protection portion extends between a portion of the seat pad and the air bag, wherein the rigid member comprises an inboard portion and an outboard portion, the end of the protection portion being located on the outboard portion of the rigid member, wherein the outboard portion includes a deflectable tab that extends towards the front of the air bag module, the tab, upon inflation of the air bag, deflecting over an opposed end of the outboard portion of the rigid cover.

18. The air bag module of claim 17 wherein the rigid member includes a frangible portion, and wherein the end of the protection portion is connected to the other portion of the rigid member at the frangible portion.

* * * * *